US010685357B2

(12) United States Patent
Bernstein et al.

(10) Patent No.: US 10,685,357 B2
(45) Date of Patent: Jun. 16, 2020

(54) SYSTEMS AND METHODS FOR REGULATING TRANSACTIONS

(71) Applicant: American Express Travel Related Services Company, Inc., New York, NY (US)

(72) Inventors: Kathi Bernstein, Murray, UT (US); David Ockwell, New Mill (GB); Michael Stuart Smith, Sandy, UT (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 418 days.

(21) Appl. No.: 15/068,990

(22) Filed: Mar. 14, 2016

(65) Prior Publication Data

US 2017/0262848 A1   Sep. 14, 2017

(51) Int. Cl.
*G06Q 20/20* (2012.01)
*G06Q 20/40* (2012.01)

(52) U.S. Cl.
CPC .......... *G06Q 20/405* (2013.01); *G06Q 20/20* (2013.01)

(58) Field of Classification Search
None
See application file for complete search history.

(56) References Cited

U.S. PATENT DOCUMENTS

| | | | |
|---|---|---|---|
| 5,991,750 A | 11/1999 | Watson | |
| 6,704,612 B1* | 3/2004 | Hahn-Carlson | G06Q 10/08 700/213 |
| 6,901,387 B2 | 5/2005 | Wells | |
| 7,392,934 B2* | 7/2008 | Hahn-Carlson | G06Q 10/10 235/376 |
| 8,635,157 B2* | 1/2014 | Smith | G06Q 20/20 705/39 |
| 8,666,895 B2* | 3/2014 | Grigg | G06Q 20/20 235/380 |
| 8,831,677 B2* | 9/2014 | Villa-Real | H04M 1/66 455/552.1 |
| 9,818,116 B2* | 11/2017 | Caldera | G06Q 20/4016 |
| 2003/0184430 A1* | 10/2003 | Kumar | G06F 21/35 340/5.2 |
| 2005/0033671 A1* | 2/2005 | Hahn-Carlson | G06Q 10/08 705/34 |
| 2005/0109838 A1* | 5/2005 | Linlor | G06Q 20/04 235/380 |
| 2007/0022375 A1* | 1/2007 | Walker | G06Q 30/02 715/210 |
| 2012/0078737 A1* | 3/2012 | Kulakowski | G06Q 20/20 705/16 |
| 2012/0096261 A1* | 4/2012 | Ko | H04L 63/0236 713/168 |
| 2012/0197743 A1* | 8/2012 | Grigg | G06Q 20/20 705/16 |

* cited by examiner

*Primary Examiner* — William J Jacob
(74) *Attorney, Agent, or Firm* — Thomas | Horstemeyer, LLP

(57) ABSTRACT

A method of authorizing transactions is provided that includes receiving from a user an action parameter, associating the action parameter with a user profile associated with the user, storing the action parameter, receiving an authorization request from a merchant for a transaction with the user, comparing the action parameter with transaction identification information, and sending an authorization response in response to comparing the action parameter with transaction identification information.

20 Claims, 3 Drawing Sheets

SYSTEMS AND METHODS FOR
REGULATING TRANSACTIONS

FIELD

FIG. 1 shows an exemplary transaction regulation system, in accordance with various embodiments.

BACKGROUND

With the various technologies allowing digital payment methods, users should be able to regulate which transactions may be authorized or rejected by the user's user profile and/or user account.

SUMMARY

A system, method, and article of manufacture (collectively, "the system") are disclosed relating to regulating transactions. In various embodiments, the system may be configured to perform operations including receiving, by a computer based system, an action parameter provided by a user. The system may be capable of associating, by the computer based system, the action parameter with a user profile associated with the user. The system may further be capable of storing, by the computer based system, the action parameter.

In various embodiments, the system may be capable of receiving, by the computer based system, an authorization request from a merchant for a transaction with the user, wherein the authorization request may comprise transaction identification information. The system may be capable of comparing, by the computer based system, the action parameter with the transaction identification information. The system may be further capable of sending, by the computer based system, an authorization response in response to comparing the action parameter with the transaction identification information.

In various embodiments, the authorization response may authorize and/or reject the transaction in response to the action parameter satisfying the transaction identification information. The authorization response may authorize and/or reject the transaction in response to the action parameter differing from the transaction identification information. The user profile may comprise a digital token, transaction account, transaction account number, user account, and/or a user account number. The action parameter and/or transaction identification information may comprise a merchant category code, a service establishment number, a point of sale terminal number, a product code, a geographical location code, and/or a dollar amount or limit. The merchant category code, service establishment number, point of sale terminal number, and/or product code may be associated with the merchant and/or a product.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The present disclosure generally relates to regulating transactions by receiving and analyzing transaction identification information. The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
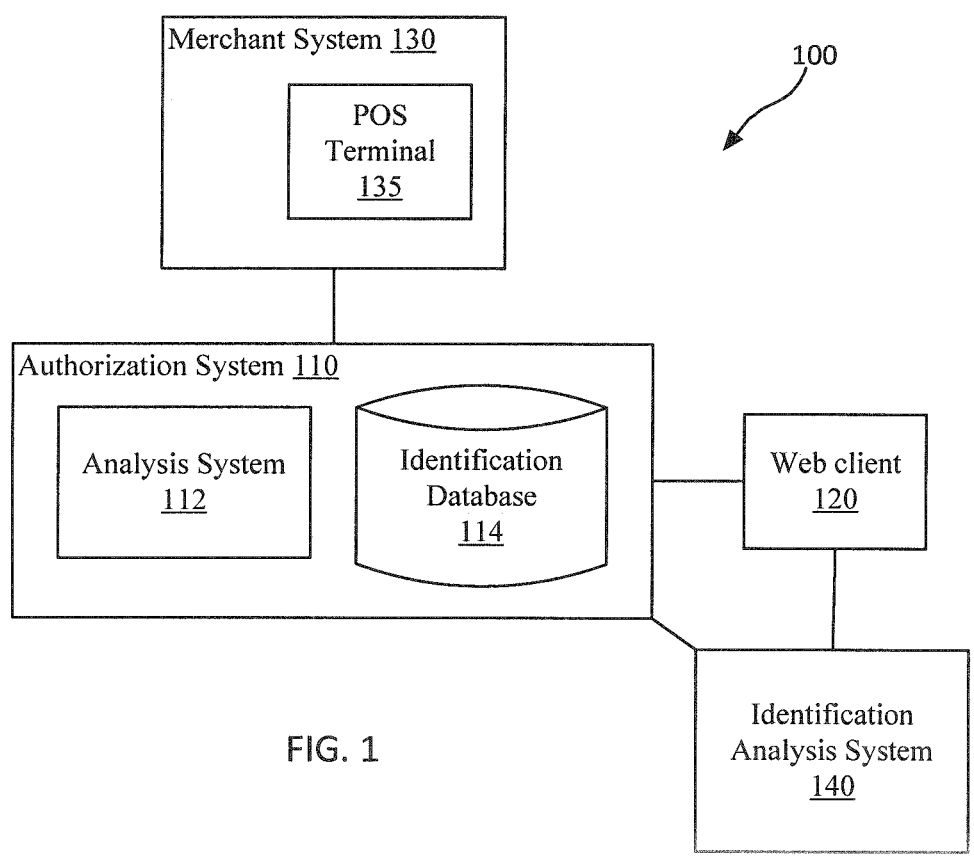
FIG. 1 shows an exemplary transaction regulation system, in accordance with various embodiments.

In various embodiments, and with reference to FIG. 1, an exemplary transaction regulation system 100 is disclosed. System 100 may comprise an authorization system 110, a web client 120, a merchant system 130, and/or an identification analysis system 140. Authorization system 110 may comprise an analysis system 112 and an identification database 114. In various embodiments, analysis system 112 and/or identification database 114 may be separate from authorization system 110. Merchant system 130 may comprise a point-of-sale (POS) terminal 135. System 100 may be computer based, and may comprise a processor, a tangible non-transitory computer-readable memory, and/or a network interface. Instructions stored on the tangible non-transitory memory may allow system 100 to perform various functions, as described herein.

In various embodiments, authorization system 110 may comprise hardware and/or software capable of storing data and/or analyzing information. For example, authorization system 110 may comprise a server appliance running a suitable server operating system (e.g., MICROSOFT INTERNET INFORMATION SERVICES or, "IIS") and having database software (e.g., ORACLE) installed thereon. Authorization system 110 may be in communication with web client 120, merchant system 130, and/or identification analysis system 140.

In various embodiments, authorization system 110 and/or identification database 114 may store one or more user profiles. A user profile may comprise profile indicia, such as a digital token, a transaction and/or payment account, a transaction and/or payment account number, a user account, a user account number, and/or the like. In various embodiments, the authorization system 110 and/or identification database 114 may also store one or more action parameters, discussed below, associated with one or more user profiles.

In various embodiments, transaction information relating to certain characteristics of various transactions may be gathered and/or stored in authorization system 110 and/or identification database 114. For example, system 100, authorization system 110, and/or identification database 114 may generate, provide, and/or store standardized codes or numbers representing characteristics of a merchant and/or transaction, such as a merchant category code (MCC) associated with and/or indicating a merchant category type (e.g., a restaurant, hardware store, clothing store, etc.), a service establishment number (SE number) associated with any merchant characteristic that indicates the merchant identity (e.g., the merchant name), a geographic location code associated with and/or indicating a geographic location, a point of sale (POS) terminal number associated with and/or indicating a POS terminal within a merchant and/or in a department within a merchant, a product code associated with and/or indicating a specific product and/or product type, and/or the like. The MCC, SE number, POS terminal code, and/or product code may be associated with a merchant and/or product. Such information stored within authorization system 110 and/or identification database 114 may be referred to as stored transaction information.

In various embodiments, web client 120 may incorporate hardware and/or software components. For example, web client 120 may comprise a server appliance running a suitable server operating system (e.g., MICROSOFT INTERNET INFORMATION SERVICES or, "IIS"). Web client 120 may be any device that allows a user to communicate with a network (e.g., a personal computer, personal digital assistant (e.g., IPHONE®, BLACKBERRY®), cellular phone, kiosk, and/or the like). Web client 120 may be in communication with authorization system 110 and/or identification analysis system 140, and may participate in any or all of the functions performed by authorization system 110 and/or or identification analysis system 140.

In various embodiments, a user may enter action criteria through web client 120. Action criteria may be criteria describing a characteristic of a transaction, wherein the user desires to pre-authorize or pre-reject the transaction based at least partially on such characteristic. In various embodiments, action criteria may comprise any characteristic of a transaction, such as merchant identity, merchant category, geographic location, POS terminal, product type, dollar amount limit, person conducting the transaction, time period of the transaction, day of the transaction, season for the transaction, reward points associated with the transaction and/or the like. As used herein, "pre-authorize" means to provide instructions to authorization system 110 to automatically authorize any portion or all of a transaction having a certain characteristic in response to a merchant requesting authorization for such a transaction. As used herein, "pre-reject" means to provide instructions to authorization system 110 to automatically reject any portion or all of a transaction having a certain characteristic in response to a merchant requesting authorization for such a transaction. In various embodiments, automatically authorizing or automatically rejecting may include sending a notification to the user (and/or an entity, an employer, a software system, a third party, etc) to allow the person being notified to agree or not agree or alter the parameters of the "automatic" authorization or rejection.

In various embodiments, identification analysis system 140 may incorporate hardware and/or software components. For example, identification analysis system 140 may comprise a server appliance running a suitable server operating system (e.g., MICROSOFT INTERNET INFORMATION SERVICES or, "IIS"). Identification analysis system 140 may be in communication with authorization system 110 and/or web client 120 and may participate in any or all of the functions performed by authorization system 110. In various embodiments, identification analysis system 140 may be a part of web client 120.

In various embodiments, identification analysis system 140 may receive the action criteria from web client 120, and compare the action criteria to stored transaction information in the authorization system 110 and/or identification database 114. An action criterion satisfying certain stored transaction information may generate an action parameter, the action parameter being associated with the stored transaction information. An action parameter may comprise a standardized code or number for the transaction characteristic/action criterion (e.g., an MCC, SE number, product code, geographic location code, POS terminal number, etc.). For example, if the action criterion provided by the user is a merchant name, and the merchant name matched a merchant name associated with an SE number in the stored transaction information, the generated action parameter would be the SE number. However, in the case of merchant names, multiple merchants may have the same word or words in their names (e.g., Lowes Hardware, Lowes Ice Cream, Lowes Plumbers). Therefore, identification analysis system 140 may receive the action criterion (the merchant name in this example) from the user, match it with multiple merchants, and in response, generate follow-up inquiries for the user to answer in order to identify the correct merchant and the correct SE number associated with the correct merchant. Follow-up inquiries may include inquiring what type of business the merchant conducts, and/or the like. This process of providing follow-up inquiries and identifying the correct action parameter may be applied to any instance in which multiple entities, places, products, etc. share a common action criterion. As another example, a user may enter an action criterion comprising a town name, but there may be multiple towns with that name (e.g., Smithville). Therefore, identification analysis system 140 may provide follow-up inquiries, such as inquiring to the user about the county or state in which the town is located, in order to identify the correct action parameter, the action parameter being the geographic location code in this example.

In various embodiments, the action parameter may be stored in authorization system 110 and/or identification database 114 and associated with the user profile of the user who generated the action parameter. In various embodiments, the action parameters may be generated, provided to authorization system 110 and/or identification database 114, and/or associated with a user profile by through web client 120 and/or identification analysis system 140. In various embodiments, identification analysis system 140 may be comprised in authorization system 110.

In various embodiments, a user may provide the action parameter directly to web client 120 as the action criterion. In such a case, identification analysis system 140 may compare and/or match the action parameter with the stored transaction information to confirm the action parameter's accuracy, or identification analysis system 140 and/or authorization system 10 may recognize the action parameter that was provided, and no comparing of the action parameter and the stored transaction data may occur. The action parameter provided by and/or generated in response to a user's input into web client 120 may be stored in identification database 114 in association with the user's user profile. In various embodiments, multiple action parameters may be stored in identification database 114 and associated with a single user profile.

In various embodiments, along with the provided and/or generated action parameter, the user may elect an action response (e.g., "authorize the transaction", "reject the transaction", "partially allow the transaction", and/or the like) to be associated with the action parameter. In various embodiments, the action response may be part of the action parameter. The action response may be configured to provide instructions to authorization system 110 regarding what action to take in response to transaction identification information associated with an authorization request matching the action parameter associated with the applicable user profile. For example, if a user wishes to prevent transactions with a certain merchant, the user may provide or generate the SE number associated with the merchant and elect "reject the transaction" as the action response. In response, authorization system 110 may affirmatively execute the action response by rejecting transactions submitted for authorization by that merchant, because the SE number matching the action parameter would be comprised in the authorization request from that merchant. Conversely, the action response may also provide instructions to authorization system 110 regarding what action to take in response to transaction identification information associated with an authorization request differing from the action parameter associated with the applicable user profile. That is, in response to the transaction identification information differing from an action parameter, authorization system 110 may negatively execute the action response, i.e., execute the action opposite of the action response. For example, say an action parameter associated with a user profile has an action response instructing authorization system 110 to "authorize the transaction" in response to the transaction identification information matching the action parameter. In response to the transaction identification information differing from the action parameter, authorization system 110 may send an authorization response rejecting the transaction. Conversely, for example, say an action parameter associated with the user profile has an action response instructing authorization system 110 to "reject the transaction" in response to the transaction identification information matching the action parameter. In response to the transaction identification information differing from the action parameter, authorization system 110 may send an authorization response authorizing the transaction.

In various embodiments, merchant system 130 may incorporate hardware and/or software components. For example, merchant system 130 may comprise a server appliance running a suitable server operating system (e.g., MICROSOFT INTERNET INFORMATION SERVICES or, "IIS"). Merchant system 130 may be in communication with authorization system 110. In various embodiments, merchant system 130 may comprise a POS terminal 135, such as a cashier station, or any other location where a user (such as a consumer or a business) may conduct a transaction with the merchant.

In response to a user initiating a transaction with a merchant through POS terminal 135, the merchant may send an authorization request for the transaction to authorization system 110. The authorization request may comprise transaction identification information, which may be standardized codes or numbers indicating the characteristics of the transaction (e.g., the MCC, SE number, geographic location code, product code, POS terminal number, transaction dollar amount, and/or the like), and/or a user profile identifier such as a digital token, a transaction and/or payment account, a transaction and/or payment account number, a user account, a user account number, and/or any other information that identifies the user profile associated with the transaction.

In various embodiments, authorization system 110 may receive the authorization request comprising the transaction identification information from merchant system 130. Analysis system 112 may analyze the transaction identification information. Analysis system 112 may identify the user profile associated to the authorization request for the transaction by matching the user profile identifier with profile indicia associated with the appropriate user profile. In response to the appropriate user profile being identified, analysis system 112 may analyze the transaction identification information in the authorization request to determine if the transaction is pre-authorized or pre-rejected by the user profile. Analysis system 112 may compare the transaction identification information with an action parameter associated with the user profile. In response to the transaction identification information matching the action parameter, analysis system 112 may determine the action to take by analyzing the action response associated with the action parameter that matches the transaction identification information. For example, say analysis system 112 determines the appropriate user profile associated with the authorization request from merchant system 130. Analysis system 112 may compare an SE number in the transaction identification information with an action parameter comprising an SE number in the user profile. In response to a match between the SE number in the transaction identification information and the action parameter, authorization system 110 may affirmatively execute the action response associated with the action parameter in that user profile by sending an authorization response with the appropriate action. In response to the action response for that SE number being "authorize the transaction", authorization system 110 may send an authorization response that authorizes the transaction. In response to the action response for that SE number being "reject the transaction", authorization system 110 may send an authorization response that rejects the transaction. In response to a difference between the SE number in the transaction identification information and the action parameter, authorization system 110 may negatively execute the action response associated with the action parameter in that user profile by sending an authorization response with the appropriate action (the opposite of the instructions of the action response, as discussed above).

In various embodiments, overall, system 100 allows users to regulate which transactions will be authorized, rejected, or partially authorized or rejected, based on any characteristic of a transaction. For example, users may determine that they only want to purchase certain goods or services, and/or purchase goods and services from a certain merchant, a certain point of sale terminal, a certain merchant type, within a certain geographic area, for under a certain dollar amount, etc., and therefore, the users may pre-authorize such transactions by providing their user profile with the appropriate action parameters and associated action responses (e.g., "authorize the transaction" or "partially authorize the transaction"). Users may also determine they wish to prevent such purchases by providing their user profile with the appropriate action parameters and associated action responses (e.g., "reject the transaction" or "partially reject the transaction").

In various embodiments, users may provide and/or generate multiple action parameters to associate with the user profile. For example, a user may want to prevent transactions with both Merchant A and Merchant B, so the user provides and/or generates action parameters comprising the SE numbers associated with Merchants A and B, and associated action responses with instructions to "reject the transaction." In response to an authorization request having transaction identification information comprising an SE number associated with either Merchant A or Merchant B, authorization system 110 may reject the transaction. Another way for the user to prevent transactions with Merchants A or B may be to provide and/or generate action parameters comprising SE numbers of Merchants C and D with associated action responses having instructions to "authorize the transaction". Therefore, if transaction identification information in an authorization request does not comprise SE numbers for either Merchant C or D, authorization system 110 may negatively execute the action response and reject the transaction, including transactions from Merchants A or B.

In various embodiments, each action parameter associated with a user profile may have an action response, or a group of action parameters may be associated with a single action response. Regarding a group of action parameters associated with a single action response, the user may elect that either one or more action parameters in the group must be matched by the transaction identification information for authorization system 110 to affirmatively execute the action response. In such a case, if there are no matches between the transaction identification information and the action parameters in the group, authorization system 110 may negatively execute the action response. For example, the user may elect to pre-authorize or pre-reject a transaction matching at least one of a certain MCC, SE number, and/or geographic location code. If none of those three transaction identification information (MCC, SE number, and/or geographic location code) are comprised in the authorization request from the merchant, authorization system 110 may negatively execute the action response. Alternatively, the user may elect that all of the action parameters in the group must be matched by the transaction identification information in order for authorization system 110 to affirmatively execute the associated action response. In such a case, if all action parameters in the group are not matched by the transaction identification information, authorization system 110 may negatively execute the action response. For example, a user may elect to have authorization system 110 authorize or reject a transaction matching all three of a certain MCC, SE number, and geographic location code.

In various embodiments, transaction identification information sent in an authorization request from a merchant may comprise more than one characteristic of the transaction. Accordingly, one or more pieces of the transaction identification information may match one or more action parameters in a user profile, and each action parameter may be associated with a distinct action response. To address such a situation, the user may have elected to rank the action parameters by importance when entering and/or generating them to be stored and associated with the user profile. In response to there being more than one match between transaction identification information and the action parameters, the action response associated with the highest-ranked action parameter that matches the transaction identification information may be affirmatively executed. Alternatively, an action parameter may be ranked by a user so that no matter what, the action taken by authorization system 110, whether affirmatively or negatively executing the action response, is the result to the comparison between the transaction identification information and that action parameter. For example, a user may elect that in any case, the user does not want to allow transactions with Merchant A (so the action parameter may be Merchant A's SE number, for instance, with an action response of "reject the transaction"). Accordingly, no matter what other pieces of transaction identification information are present in the authorization request from a merchant, if the authorization request does not comprise Merchant A's SE number, the transaction may be authorized, or vice versa.

In various embodiments, a user may elect any single action parameter or any action parameter group to have a higher or lower importance rank than other action parameter or action parameter group.

Figure 2:
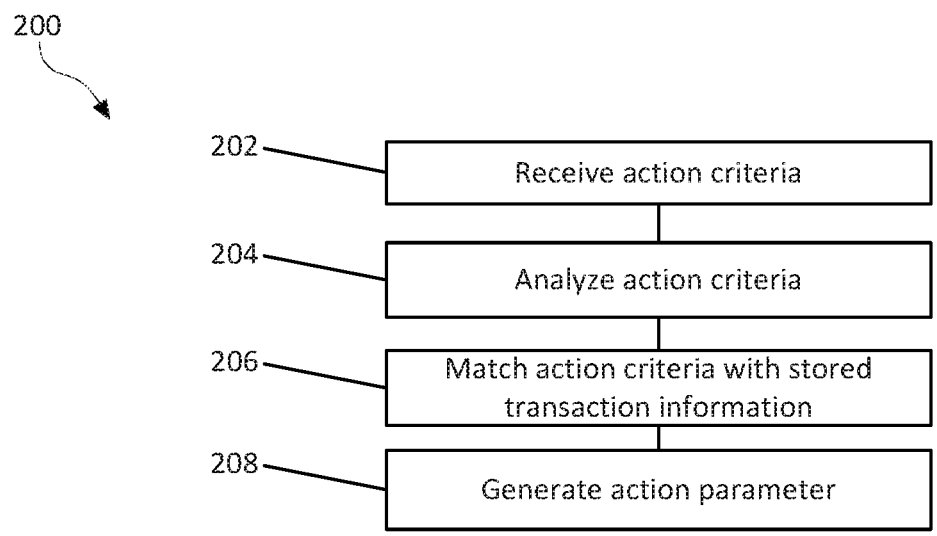
FIG. 2 shows a flowchart depicting an exemplary method for identifying an action parameter based on received action criteria, in accordance with various embodiments.
Figure 3:
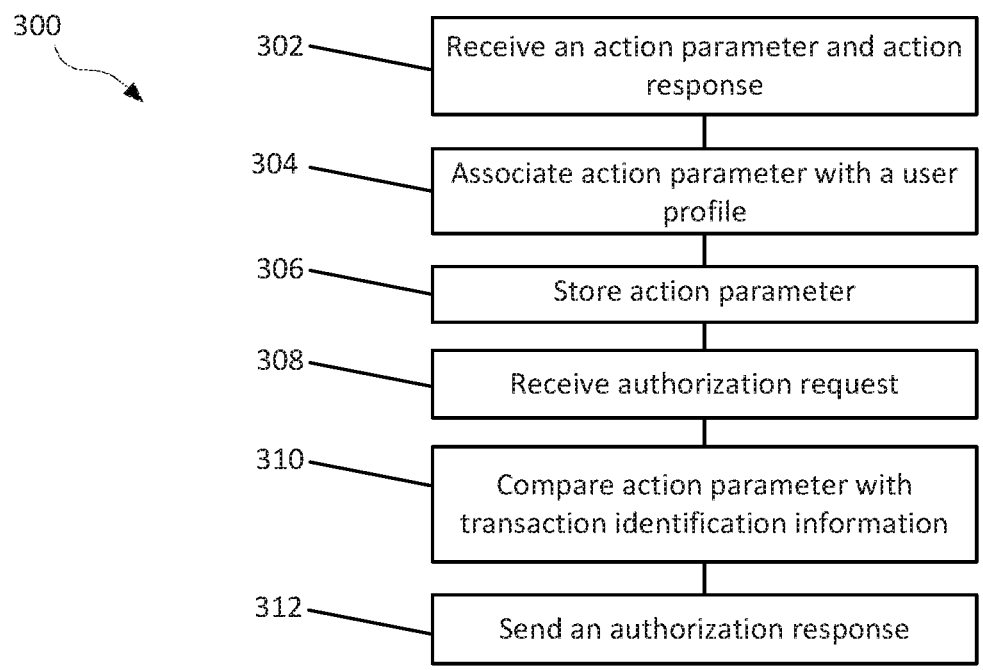
FIG. 3 shows a flowchart depicting an exemplary method for regulating transactions based on transaction identification information, in accordance with various embodiments.

With respect to FIGS. 2 and 3, the process flows depicted are merely embodiments and are not intended to limit the scope of the disclosure. For example, the steps recited in any of the method or process descriptions may be executed in any order and are not limited to the order presented. It will be appreciated that the description herein makes appropriate references not only to the steps and user interface elements depicted in FIGS. 2 and 3, but also to the various system components as described above with reference to FIG. 1.

In accordance with various embodiments, FIG. 2 depicts a method for identifying an action parameter based on received action criteria. With combined reference to FIGS. 1 and 2, identification analysis system 140 may receive an action criteria (step 202) from a user. The user may provide the action criteria to web client 120, and web client 120 may provide the action criteria to identification analysis system 140. Identification analysis system 140, in various embodiments, may be a part of authorization system 110. The action criteria may be one or more characteristics of a transaction, as discussed in the description of system 100 above.

In various embodiments, identification analysis system 140 may analyze the action criteria (step 204), which may include identification analysis system 140 determining what type of information the action criteria includes (e.g., a merchant name, merchant location, merchant type, etc.). Based on the analysis, identification analysis system 140 may match the action criteria with stored transaction information (step 206) in identification database 114. Stored transaction information may be associated with action parameters. Accordingly, based on the match between the action criteria and the stored transaction information, an action parameter may be generated (step 208). The action parameter may be stored in the authorization system 110 and/or identification database 114 and associated with the user profile of the user that provided the action criteria. In various embodiments, as discussed above, a user may provide an action parameter to web client 120. In such a case, identification analysis system 140 may or may not analyze the action parameter and/or match the provided action parameter with stored transaction information. Also, identification analysis system 140 may or may not generate an action parameter because an action parameter has already been provided. Identification analysis system 140 may confirm the action parameter (which may include matching the provided action parameter with stored transaction information).

In accordance with various embodiments, FIG. 3 depicts a method of regulating transactions based on transaction identification information. With combined reference to FIGS. 1 and 3, in various embodiments, authorization system 110 and/or identification database 114 may receive an action parameter and/or an action response associated with the action parameter (step 302) from web client 120 and/or identification analysis system 140. The action parameter, as discussed in the description of FIG. 2, may be provided from the user, or generated by identification analysis system 140 from analyzing action criteria provided by the user. Authorization system 110 and/or identification database 114 may associate the action parameter with a user profile (step 304), the user profile being associated with the user who provided the action parameter or the action criteria that led to the generation of the action parameter. The action parameter and/or action response may be stored in authorization system 110 and/or identification database 114 (step 306) along with the user profile with which the action parameter is associated. The action parameter and associated action response and may be used to regulate which transactions will be authorized, rejected, or partially authorized or rejected, as discussed in the description of system 100 above.

In various embodiments, the user may initiate a transaction with a POS terminal 135. POS terminal 135 and/or merchant system 130 may send an authorization request to authorization system 110 in order to complete the transaction. Authorization system 110 may receive the authorization request (step 308). The authorization request may comprise transaction identification information which may include characteristics about the transaction (e.g., an MCC, SE number, geographic location code, POS terminal number, product code, dollar amount) and/or a user profile identifier. Authorization system 110 and/or analysis system 112 may identify the user profile associated to the authorization request for the transaction by matching the user profile identifier with profile indicia associated with the appropriate user profile. Authorization system 110 and/or analysis system 112 may compare the transaction identification information with an action parameter (step 310) associated with the user profile. Based on a result from comparing the transaction identification information with the action parameter, authorization system 110 may send an authorization response (step 312) to merchant system 130. For example, say the action response is "authorize the transaction" (or "reject the transaction"). In response to the transaction identification information matching the action parameter, the action response associated with the action parameter may be affirmatively executed by authorization system 110, which may send an authorization response that authorizes (or rejects) the transaction (i.e., taking the action instructed by the action response). In response to the transaction identification information differing from the action parameter, the action response may be negatively executed by authorization system 110 sending an authorization response that rejects (or authorizes) the transaction (i.e., taking the action opposite of what is instructed by the action response). As described above, in various embodiments, the user may have ranked and/or grouped one or more action parameters and/or groups of action parameters in the user profile, so the action executed by the authorization system 110 would reflect such ranking and/or grouping elections made by the user.

In various embodiments, with an action parameter being a dollar limit, the transaction identification information may match the action parameter when the transaction identification information comprises a dollar amount that is less than or equal to the dollar limit of the action parameter.

The various components in system 100 may be independently, separately or collectively suitably coupled to each other, and/or the network, via data links which include, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Terms and phrases similar to "associate" and/or "associating" may include tagging, flagging, correlating, using a look-up table or any other method or system for indicating or creating a relationship between elements, such as, for example, (i) a user profile and (ii) an action parameter. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the user may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, FACEBOOK, TWITTER, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "user profile" or "user profile data" may comprise any information or data about a consumer that describes an attribute associated with the user (e.g., a preference, an interest, demographic information, personally identifying information, and the like), and/or payment, account, and/or transaction information associated with the user.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" and/or "indicia" may be any suitable identifier that uniquely identifies a user profile, user account, a user, and/or action. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACK-BERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the account or external to but affiliated with account. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the account, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or account. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a My SQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE® ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant system and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Phrases and terms similar to an "entity" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "user account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, pre-paid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to "vendor software" or "vendor" may include software, hardware and/or a solution provided from an external vendor (e.g., not part of the merchant) to provide value in the payment process (e.g., risk assessment).

What is claimed is:

1. A method, comprising:
receiving, by a computer based system, a first action parameter, wherein the first action parameter comprises a code indicating that a transaction comprising a transaction characteristic is pre-approved or pre-rejected that is generated based upon at least one answer to at least one inquiry received from a user, and wherein the first action parameter comprises at least one of a merchant category code, a service establishment number, a point of sale terminal number, a product code, a geographical location code, or a dollar limit;
associating, by the computer based system, the first action parameter with a user profile associated with the user in an identification database of an authorization system;
receiving, by the computer based system and via the authorization system, an authorization request from a point of sale terminal associated with a merchant for the transaction with the transaction characteristic, the authorization request comprising transaction identification information, which indicates a plurality of characteristics of the transaction with the user;
identifying, by the computer based system, the user profile associated with the transaction identification information in the identification database;
comparing, by the computer based system, the first action parameter with the plurality of characteristics of the transaction;
determining, by the computer based system, an authorization response that automatically approves the transaction, in response to the first action parameter differing from the transaction identification information; and
sending, by the computer based system and via the authorization system, the authorization response to the point of sale terminal associated with the merchant.

2. The method of claim 1, wherein the user profile comprises at least one of a digital token, a transaction account, a transaction account number, a user account, or a user account number.

3. The method of claim 1, further comprising:
receiving, by the computer based system, action criteria;
determining, by the computer based system, a type of information in the action criteria; matching, by the computer based system, the type of information with stored transaction information;
identifying, by the computer based system, multiple matches between the type of information with the stored transaction information;
sending, by the computer based system, the at least one inquiry to the user;
receiving, by the computer based system, answers to the at least one from the user;
determining, by the computer based system and based on the answers, a second action parameter associated with the stored transaction information; and
associating, by the computer based system, the second action parameter with the user profile associated with the user.

4. The method of claim 1, wherein the transaction identification information comprises at least one of the merchant category code, the service establishment number, the point of sale terminal number, the product code, the geographical location code, or the dollar limit.

5. The method of claim 4, wherein at least one of the merchant category code, the service establishment number, the point of sale terminal number, or the product code is associated with at least one of the merchant or a product.

6. An article of manufacture including a non-transitory, tangible computer readable memory having instructions stored thereon that, in response to execution by a computer based system, cause the computer based system to perform operations comprising:
receiving, by a computer based system, a first action parameter, wherein the first action parameter comprises a code indicating that a transaction comprising a transaction characteristic is pre-approved or pre-rejected that is generated based upon at least one answer to at least one inquiry received from a user, and wherein the first action parameter comprises at least one of a merchant category code, a service establishment number, a point of sale terminal number, a product code, a geographical location code, or a dollar limit;
associating, by the computer based system, the first action parameter with a user profile associated with the user in an identification database of an authorization system;
receiving, by the computer based system and via the authorization system, an authorization request from a point of sale terminal associated with a merchant for the transaction with the transaction characteristic, the authorization request comprising transaction identification information, which indicates a plurality of characteristics of the transaction with the user;
identifying, by the computer based system, the user profile associated with the transaction identification information in the identification database;
comparing, by the computer based system, the first action parameter with the plurality of characteristics of the transaction;
determining, by the computer based system, an authorization response that automatically approves the transaction, in response to the first action parameter differing from the transaction identification information; and
sending, by the computer based system and via the authorization system, the authorization response to the point of sale terminal associated with the merchant.

7. The article of claim 6, further comprising:
receiving, by the computer based system and from the user, a ranking of the first action parameter over a second action parameter; and
obtaining, by the computer based system, the ranking of the first action parameter to conduct the comparing.

8. The article of claim 6, further comprising:
receiving, by the computer based system, action criteria;
determining, by the computer based system, a type of information in the action criteria;
matching, by the computer based system, the type of information with stored transaction information;
identifying, by the computer based system, multiple matches between the type of information with the stored transaction information;
sending, by the computer based system, the at least one inquiry to the user;

receiving, by the computer based system, answers to the at least one from the user;

determining, by the computer based system and based on the answers, a second action parameter associated with the stored transaction information; and associating, by the computer based system, the second action parameter with the user profile associated with the user.

9. The article of claim 6, wherein the transaction identification information comprises at least one of the merchant category code, the service establishment number, the point of sale terminal number, the product code, the geographical location code, or the dollar limit.

10. The article of claim 9, wherein at least one of the merchant category code, the service establishment number, the point of sale terminal number, or the product code is associated with at least one of the merchant or a product.

11. A computer based system comprising:

a processor; and a tangible, non-transitory memory configured to communicate with the processor, the tangible, non-transitory memory having instructions stored thereon that, in response to execution by the processor, cause the processor to perform operations comprising:

receiving, by a computer based system, a first action parameter, wherein the first action parameter comprises a code indicating that a transaction comprising a transaction characteristic is pre-approved or pre-rejected that is generated based upon at least one answer to at least one inquiry received from a user, and wherein the first action parameter comprises at least one of a merchant category code, a service establishment number, a point of sale terminal number, a product code, a geographical location code, or a dollar limit;

associating, by the computer based system, the first action parameter with a user profile associated with the user in an identification database of an authorization system;

receiving, by the computer based system and via the authorization system, an authorization request from a point of sale terminal associated with a merchant for the transaction with the transaction characteristic, the authorization request comprising transaction identification information, which indicates a plurality of characteristics of the transaction with the user;

identifying, by the computer based system, the user profile associated with the transaction identification information in the identification database;

comparing, by the computer based system, the first action parameter with the plurality of characteristics of the transaction;

determining, by the computer based system, an authorization response that automatically approves the transaction, in response to the first action parameter differing from the transaction identification information; and sending, by the computer based system and via the authorization system, the authorization response to the point of sale terminal associated with the merchant.

12. The system of claim 11, further comprising:

receiving, by the computer based system and from the user, a ranking of the first action parameter over a second action parameter; and obtaining, by the computer based system, the ranking of the first action parameter to conduct the comparing.

13. The system of claim 11, further comprising:

receiving, by the computer based system, action criteria;

determining, by the computer based system, a type of information in the action criteria;

matching, by the computer based system, the type of information with stored transaction information;

identifying, by the computer based system, multiple matches between the type of information with the stored transaction information;

sending, by the computer based system, the at least one inquiry to the user;

receiving, by the computer based system, answers to the at least one from the user;

determining, by the computer based system and based on the answers, a second action parameter associated with the stored transaction information; and associating, by the computer based system, the second action parameter with the user profile associated with the user.

14. The system of claim 13, wherein at least one of the merchant category code, the service establishment number, the point of sale terminal number, or the product code is associated with at least one of the merchant or a product.

15. The method of claim 1, wherein the authorization response rejects the transaction in response to the action parameter matching the transaction identification information.

16. The article of claim 6, wherein the authorization response rejects the transaction in response to the action parameter matching the transaction identification information.

17. The system of claim 11, wherein the authorization response rejects the transaction in response to the action parameter matching the transaction identification information.

18. The method of claim 1, wherein the first action parameter is obtained through a web client executed by the computer based system.

19. The article of claim 6, wherein the first action parameter is obtained through a web client executed by the computer based system.

20. The system of claim 11, wherein the first action parameter is obtained through a web client executed by the computer based system.

* * * * *